(12) United States Patent
Wunderle

(10) Patent No.: US 11,229,326 B2
(45) Date of Patent: Jan. 25, 2022

(54) SPATULA FOR STIRRING BOWLS

(71) Applicant: Johannes Wunderle, Kenzingen (DE)

(72) Inventor: Johannes Wunderle, Kenzingen (DE)

( * ) Notice: Subject to any disclaimer, the term of this patent is extended or adjusted under 35 U.S.C. 154(b) by 0 days.

(21) Appl. No.: 17/051,984

(22) PCT Filed: Aug. 26, 2019

(86) PCT No.: PCT/IB2019/057153
§ 371 (c)(1),
(2) Date: Oct. 30, 2020

(87) PCT Pub. No.: WO2020/044200
PCT Pub. Date: Mar. 5, 2020

(65) Prior Publication Data
US 2021/0235937 A1 Aug. 5, 2021

(30) Foreign Application Priority Data
Aug. 28, 2018 (DE) ...................... 10 2018 120 928.2

(51) Int. Cl.
*A47J 43/07* (2006.01)
*A47J 43/28* (2006.01)
(Continued)

(52) U.S. Cl.
CPC ......... *A47J 43/288* (2013.01); *A47J 43/0716* (2013.01); *A47J 43/0722* (2013.01);
(Continued)

(58) Field of Classification Search
CPC .. A47J 43/046; A47J 43/0716; A47J 43/0722; B01F 7/00208; B01F 15/00058
(Continued)

(56) References Cited

U.S. PATENT DOCUMENTS 2,930,596 A * 3/1960 Waters ................. A47J 43/046
366/279
5,791,777 A 8/1998 Mak
(Continued)

FOREIGN PATENT DOCUMENTS

| DE | 1554642 A1 | 1/1970 | |
| EP | 2060216 A1 * | 5/2009 | .......... A47J 43/0716 |
| EP | 3578089 A1 * | 12/2019 | .......... A47J 43/0716 |

OTHER PUBLICATIONS

PCT/IB2019/057153 International Search Report and Written Opinion dated Dec. 2, 2019.
(Continued)

*Primary Examiner* — Reginald Alexander
(74) *Attorney, Agent, or Firm* — Wagenknecht IP Law Group PC

(57) ABSTRACT

The removal aid serves for removal of liquid and solid mix from a stirring bowl, the removal aid having a handle and a work element and is intended for a rotation. The working element has a centering aid which is designed to cooperate with a stirring unit's end of the stirring unit, the end pointing towards the opening, and a convex reception region with a spatula-like working edge that points towards the working direction, so that the removal aid can be centred onto said stirring unit's end and can be rotated in the working direction inside the stirring bowl.

17 Claims, 3 Drawing Sheets

(51) Int. Cl.
B01F 7/00 (2006.01)
*B01F 15/00* (2006.01)

(52) U.S. Cl.
CPC ....... B01F 7/00208 (2013.01); *A47J 43/0727* (2013.01); *B01F 15/00058* (2013.01)

(58) Field of Classification Search
USPC ...... 99/309, 311, 312, 313, 329.3, 509, 511, 99/512, 513; 366/509, 510, 348, 309, 366/310, 329.3
See application file for complete search history.

(56) References Cited

U.S. PATENT DOCUMENTS

| | | | |
|---|---|---|---|
| 6,012,837 A * | 1/2000 | Thuma ................ | A47J 43/0722 366/294 |
| 2004/0240313 A1 | 12/2004 | Fallowes | |
| 2012/0294108 A1* | 11/2012 | Dickson, Jr. ...... | B01F 15/00058 366/205 |
| 2015/0258512 A1* | 9/2015 | Haney ............... | B01F 15/00058 366/205 |
| 2016/0316971 A1* | 11/2016 | Behar ................ | A47J 43/0722 |

OTHER PUBLICATIONS

PCT/IB2019/057153 International Search Report and Written Opinion dated Nov. 6, 2019.

\* cited by examiner

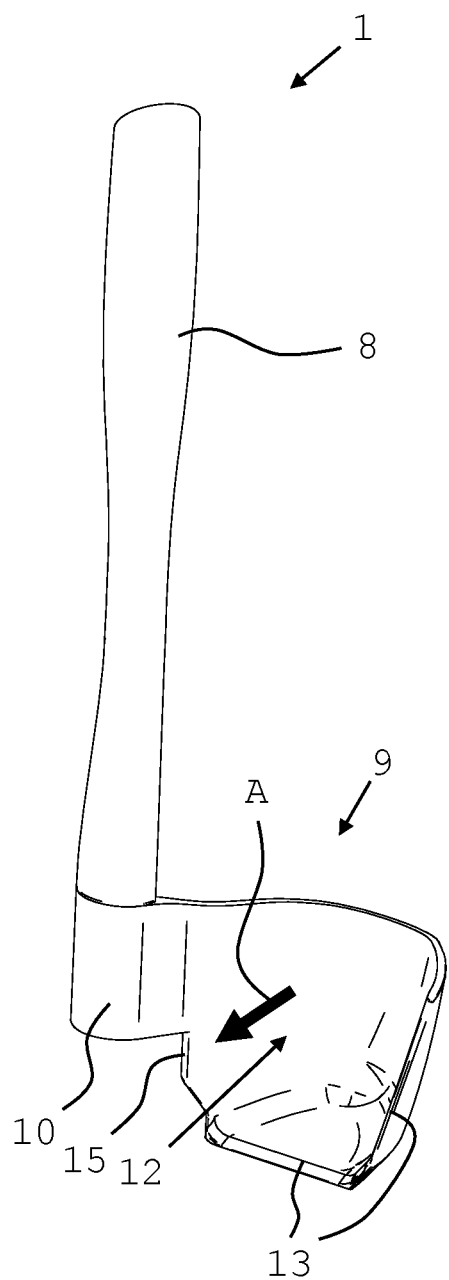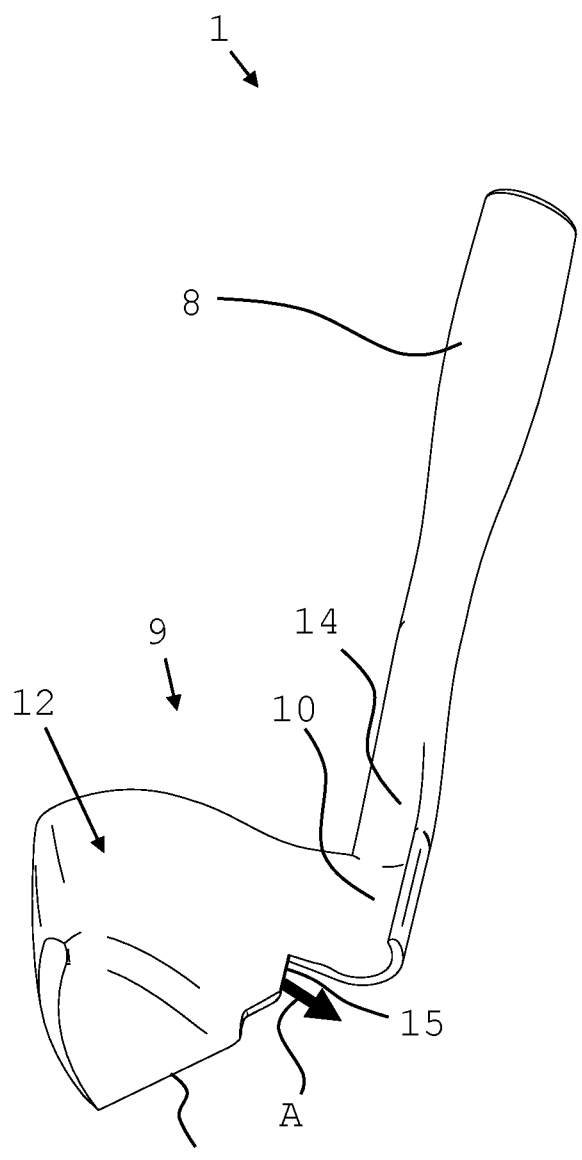
FIG. 1
FIG. 2

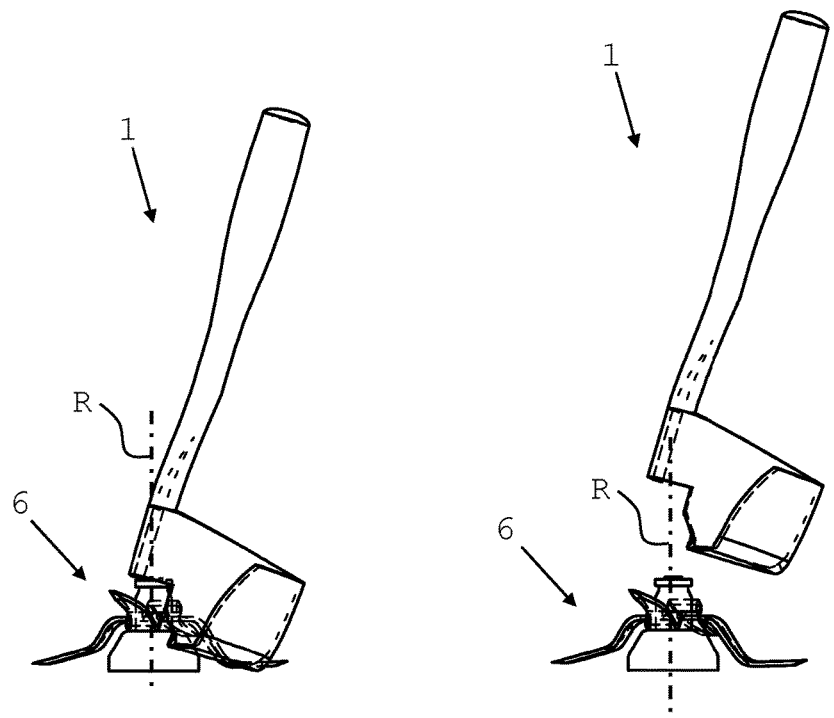
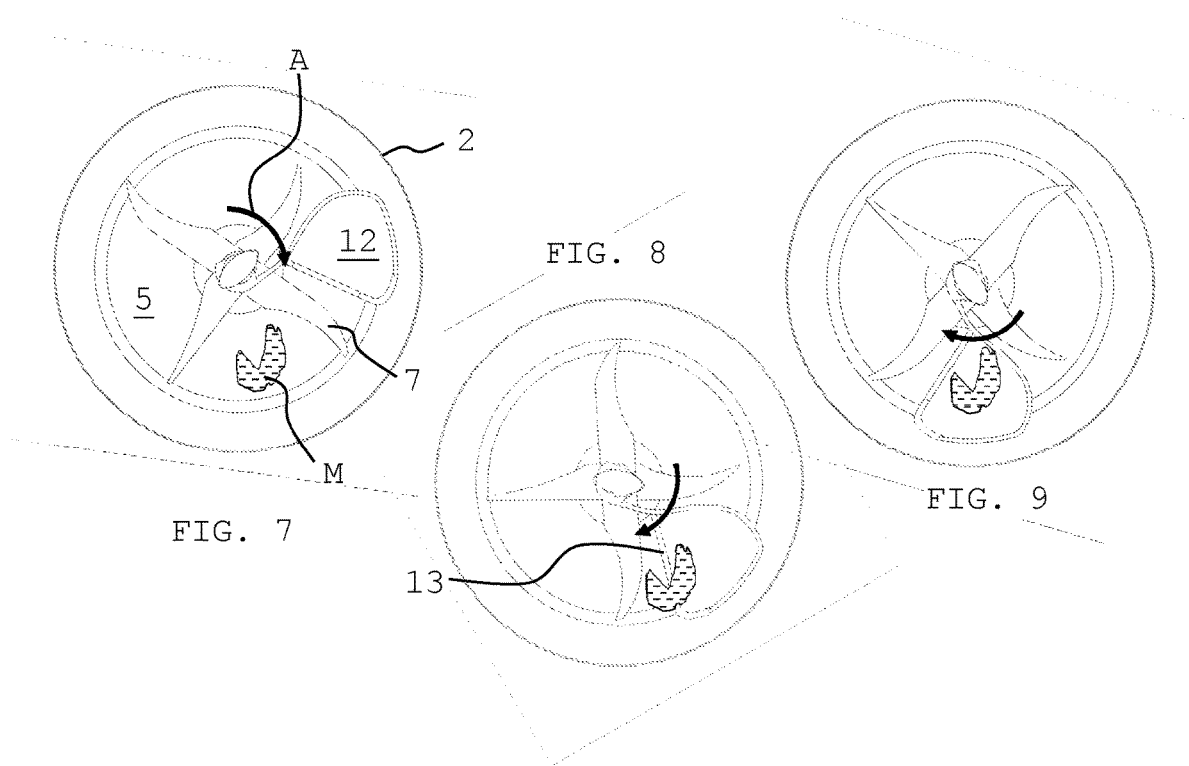

SPATULA FOR STIRRING BOWLS

CROSS REFERENCE TO RELATED APPLICATIONS

This is a US national phase application under 35 USC § 371 of international application no. PCT/IB2019/057153, filed 26 Aug. 2019, which claims priority to German application no. 102018120928.2, filed 28 Aug. 2018. The applications referred to in this paragraph are herein incorporated by reference in their entireties.

TECHNICAL FIELD

The invention relates to a spatula. In particular, the invention relates to a spatula for household area stirring bowls that have a stirring unit which can be guided through the bottom.

BACKGROUND OF THE INVENTION

For mixing, crushing or emulsifying foodstuffs in order to produce a mix such as e.g. a dough, a sauce or the like, besides the manual mixing with e.g. a cooking spoon or whisk, electrically driven stirring machines, often simply called "food processors", are commonly used.

Amongst others, such a food processor comprises a container (stirring bowl, mixing cup), and a stirring unit which rotates and thus mixes and/or crushes the ingredients which are present in the container. During the mixing process, the container is firmly attached to a support of the food processor. Known food processors can have a stirring or crushing unit that reaches from above into the bowl, as well as from below through the container bottom into the bowl; in the following, these are always collectively called "stirring unit".

While the former can have a bowl with virtually completely smooth inner walls, this is not the case with the latter due to its design, since a bushing for the mixing unit is needed which typically is located in the centre of the bottom of the bowl.

The mixing unit itself can be made from metal, and it can have sharp edges at its rotating functional elements, called knives. The number and position of the individual functional elements relative to each other can vary depending on the functional principle and construction.

In order to achieve a most complete accumulation of the mix, document DE 15 54 642 B2 discloses a stirring tool to which a scraping wing is attached. It co-rotates with the rotating functional elements and is designed such that it scrapes along the inner wall of the bowl. It thus collects adhering mix which then falls back onto the bottom of the bowl.

A comparable solution is known from document US 2004/0 240 313 A1. In order to reduce the typically very high rotational speeds of the stirring unit, a planetary gearing is arranged upstream the scraper. This device is also provided for usage during operation of the stirring unit.

After completing the mixing process, the bowl can be taken out of the support of the food processor, and be emptied in order to fill the mix for further processing or consumption into another vessel. Depending on the consistency of the mix, a part thereof can adhere to the inner walls and the bottom of the receptacle, or remain lying there. Usage of spoons, scoops or the same also results in comparably large amounts of mix remaining in the bowl.

In order to most completely remove the mix from the container, so called spatulas or scoops can be used.

Spatulas for the described purpose are well known from the art. Such a spatula essentially comprises a handle and a work element. The work element consists of a principally flat element which has the shape of a scraper or spoon. Such spatulas also serve for the cleaning of the mixing vessel, and they can as well be used for the removal or addition of foodstuffs, and/or for stirring. The handle can be made from plastic, wood or metal. The work element is typically made from a material which is softer than the container that can be made from glass or metal. Metal, plastics with various hardness grades, ceramics or wood are used therefore.

In case of a particularly liquid mix, and in cases when the container shall not be dumped, so called scoops are preferably used, also called dippers or ladles. Scoops of the aforementioned kind have been sufficiently described in the prior art. These also comprise a handle and a work element, which however, compared to the flatter working element of a spatula, features a bulgy or hemispherical retainer. In this retainer which comprises a volume, the mix can be transported.

The usage of spatulas of the described type is problematic in particular with regard to bowls that have a stirring unit which is located at the bottom, inasmuch as the unit impedes the scraping guiding of the spatula along the bottom area. As a result, mix remains in the region of the stirring unit, which is undesired. Further, sharp-edged parts of the stirring unit can damage the working element of the spatula, which is preferably, as mentioned, made from soft material in order to adapt to the different contours of the inner region of the bowl (side, transition region, bottom). Further, even if the bowl has no stirring unit at the bottom, the successful usage of a spatula needs quite some experience with regard to the continuous adaption of its orientation in relation to the inner wall during the simultaneous scraping motion along the same, since otherwise, stripes remain inside the container again and again. Insofar, the working result (speed, thoroughness) of using a spatula depends on the actual user, which is a disadvantage. Document DE 10 2014 112 518 A1 therefore suggests a spatula having a shield firmly located between handle and work element, with a diameter being only slightly smaller than the diameter of an opening of a mixing vessel. Thus, the shield laterally guides the spatula. However, usage of a shield is impractical with regard to common stirring bowls having a very large opening, since the shield would have to be very large as well. Further, the proposed spatula does not solve the problem of removing mix adhering to region of the stirring unit. Also, the spatula fails at removing liquid mix.

In the case of particularly liquid mix, the spatula is hardly usable, since the mix which is already taken up by the spatula's edge and is pushed onto the spatula area quickly drops off the spatula again; a satisfying work result can only be achieved by a very fast or a very frequent repetition of the work motion. In fact, such a mix can be removed more easily by means of a scoop; however, because of its bulky shape, even more mix remains in the poorly accessible region below the stirring unit and the transition region between inner wall and bottom area, in particular, when the transition region has a very small or very large radius. Further, also in case of a scoop, damages can occur due to, or of, the stirring unit.

Spatula as well as scoop can jam with the stirring unit during performing the complex movements which are necessary for removing the mix.

Particularly critical is a situation in which an unintended operation of the rotating components of the stirring unit occurs. Damage to the spatula or scoop as well as to the stirring unit can hardly be avoided. Also, the user can injure himself with the suddenly rotating handle. But even when the stirring unit stands still, the manual removing of mix rests, often exercised with the fingers, from the poorly accessible region of the stirring unit can result in injuries from sharp-edged parts thereof.

In order to avoid at least a collision of spatula and stirring unit, document DE 7 902 592 U1 proposes to arrange a moveable disc between work element and handle of the spatula which is larger than the opening of the lid of a mixing vessel. However, by means of such a spatula it is impossible to get at the bottom of the vessel. Furthermore, this spatula also fails during the removal of a liquid mix.

OBJECT OF THE INVENTION AND SOLUTION

The object of the invention is therefore to provide an apparatus and a method which avoid the drawbacks of the prior art. Accordingly, the apparatus according to the invention shall be suitable for the effective, i.e. fast and as complete as possible removal of solid as well as of liquid mix from stirring bowls and the same, and in particular in cases when they have a stirring unit which is guided through the bottom. Injure of the user by using the apparatus shall be excluded, as well as damage of the stirring unit, or jamming of the apparatus therewith. Also, the danger of unintended operation of the stirring unit shall be reduced. Further, use of the apparatus shall largely be independent from a user's experience.

SUMMARY OF THE INVENTION

At first, a description of the removal aid according to the invention is presented. Subsequently, a description of the method of use thereof follows.

The removal aid serves for removal of liquid and solid mix from a stirring bowl for a food processor. It is clear that the terms "liquid" and "solid" must not be understood too narrow, meaning that they are not limited to aqueous matter on one hand, and rigid matter on the other. Also pasty, dough-like mix, and mix which consists of various viscous components is presently included.

"Food processor" means any electrically driven device which is suitable for the processing of foodstuffs, such as in particular the mixing, stirring, crushing and emulsifying thereof. The stirring bowl comprises an opening, an inner wall, and a bottom. In a transition region, inner wall and bottom merge with one another; the same can be designed sharp-edged, or have a large diameter. By definition, this transition region can be seen as part of the inner wall or of the bottom. Presently, the term "stirring bowl" is to be understood in a broad sense and means any containment being suitable for receiving mix, i.e. also shakers, pots suitable for cooperating with food processors, and the like.

Within the stirring bowl, a rotatable stirring unit is located, more precisely: a stirring unit having rotatable components, which reaches into the interior of the stirring bowl through the bottom and which has at least one functional element for mixing and/or crushing the mix. The functional element can e.g. be a dough hook, a whisk or a cleaver. The functional element always stretches up to the central region of the stirring bowl, where the rotation axis of the stirring unit is located. It stretches in contrary, radial direction towards the inner wall of the stirring bowl. Preferably, it is designed (in a top view) as a "spoke", which means that (when viewed in rotation direction) an empty region exists in front of and behind the functional element. Typically, at least two, and often, even three or four such functional elements exist which extend radially towards the outside.

The removal aid comprises a handle and a work element. The handle is designed for being held and manipulated (rotated) by one hand of the user. Preferably, it is made from or coated with a material which is flexurally rigid and pleasant to the touch, and a particular preference is that it is dishwasher-safe. The work element serves the actual reception of the mix to be removed. The entire removal aid is intended for a rotation in a "working direction". This preferably corresponds to the aforementioned rotation direction; however, it can also run opposite to the same. This means also that (when in a working position) it can be rotated around a rotation axis, which corresponds to the rotation axis of the stirring unit.

According to the invention, the removal aid is characterized in that the working element has a centering aid which is designed to cooperate with a stirring unit's end of the stirring unit, said end pointing towards the opening, said end subsequently being briefly called "stirring unit's end". Thus, the centering aid is arranged such that the removing aid can be aligned with said end while contacting the same. Herein, use is made of the fact that the stirring unit's end is arranged just concentrically with the stirring bowl, thus being suitable for an as well concentric arrangement of the removal aid.

In an operating position, the rotation axis of the handle, the centering aid, and the rotation axis of the stirring unit preferably coincide.

According to the invention, the removal aid further has a convex reception region with a spatula-like working edge that points towards the working direction. "Spatula-like" means that the working edge is relatively sharp in order to allow the removal of mix which is possible by spatulas. The working edge is preferably designed in the manner of a blade, i.e. it has a particularly sharp tip that continuously thickens. "Convex" means that the reception area is not essentially flat as a spatula, but comprises a volume which is accessible through an opening. The "bulge" of the volume is formed contrary to the working direction. The volume is dimensioned such that a suitable amount of mix can be received therein; as a rough estimation, the volume of a common scoop can be taken; it ranges in the region of some 10 to some 100 Millilitres. At least in the section of the reception region which points towards the bottom and/or the inner wall, the working edge is located which delimits the reception region in direction of its opening.

As a result, the removal aid can be centred onto said stirring unit's end and can be rotated in (and typically also against the) working direction inside the stirring bowl.

The invention thus avoids the disadvantages known from the art.

Due to the combination of spatula-like working edge and scoop-like reception region according to the invention, rigid mix can be effectively be lifted off from the inner wall of the stirring bowl, and liquid mix can also be received and kept within the reception region. The shape of the work element allows the usage also with stirring bowls which have a stirring unit that is guided through the bottom, since the working element can be placed between the functional elements of the stirring unit. An injure of the user during operation of the apparatus is excluded, since on one hand, the removal aid reaches also into the regions below the functional elements, such that manual cleaning of these regions by means of the fingers becomes obsolete, and on the other, it can be placed by means of the centering aid exactly in a way such that it does not collide with the stirring unit. For this reason, also, damage of the stirring unit or jamming of the removal aid with the same is avoided. In case of an unintended operation of the stirring unit, the removal aid will co-rotate; however, since the user's hand only touches the preferably rotational-symmetric handle, the same can rotate in the hand without resulting in an immediate injure. Also, usage of the removal aid according to the invention is mostly independent of the experience of the user, since it can be correctly positioned in a simple manner, and because, for correct operation, it must only be rotated, without the need to simultaneously being tilted in various directions.

Subsequently, various embodiments of the invention are described in detail.

According to a preferred embodiment, the working edge has a shape corresponding to the contour of the bottom and/or to the inner wall. Particularly preferred, the shape corresponds to the contour of the bottom as well as of the inner wall. In the case of an essentially flat bottom which is oriented perpendicular to the rotation axis of the stirring unit, the working edge runs in this region parallel to the plane of the bottom, and particularly preferably is collinear with the same, i.e. the working edge is located in the same plane as the bottom. The same is true for the inner wall, as well as for a possibly present transition region. Also in a case when bottom and inner wall together have a strongly rounded, even circle-segment-like cross section, the working edge is shaped accordingly in those sections in which it butts against the inner side of the stirring bowl.

In this way, a particularly high lift off-rate is achieved, since due to the identity of contours, practically no mix can pass below the working region.

According to another preferred embodiment, the reception region also has, in its section pointing towards the bottom and/or the inner wall, a shape corresponding to the contour of the bottom and/or the inner wall; particularly preferred, this is true for both sections. If e.g. the bottom is flat, the corresponding section of the reception region lies parallel to, and particularly preferred, coplanar with the same. This is true for the inner wall as well; the previous paragraph's remarks are valid for the reception region as well.

By means of the planar "elongation" of the contour of the working edge into the reception region, the lift-off rate is further enhanced; also, the volume of the reception region is further increased.

According to a further embodiment, the centering aid has a hollow end region with an inner diameter which is adjusted to the outer diameter of the stirring unit's end, said end beginning, by definition, above the functional elements. Typically, the upwards-oriented end of a stirring unit which is located on the bottom of a stirring bowl has a round end piece, or an end piece which features a round sheathe area or fits within such an area. This applies e.g. also to the shape of a hexagonal nut. Onto this "end piece", i.e. the stirring unit's end, the centering aid can be put or plugged, if its inner diameter slightly exceeds the outer diameter of the end (or its sheathe area, respectively).

According to another embodiment, the stirring unit's end is therefore not round, and the hollow end region is adapted to the shape of the stirring unit's end such that despite the non-circular shape, it can be plugged onto the stirring unit's end. Thus, in both cases, the stirring unit's end serves as a seat for the end region of the centering aid.

Particularly preferred, the end region of the centering aid then has a depth which exceeds the length of the stirring unit's end. Thus, the stirring unit's end can completely be received by the end region. The radially extending functional elements then serve as support for the tip of the centering aid, such that the vertical position is clearly defined.

If the depth is smaller than the length of the stirring unit's end, the tip of the stirring unit's end can serve as support in the interior of the hollow end region in order to clearly define the vertical position as well.

According to another preferred embodiment of the centering aid, the same again has said hollow end region, wherein the latter has at least at an end section a laterally open, e.g. semicircular shaped, cross section which is designed for pushing the centering aid onto the stirring unit's end. This means that the cross section is roughly semicircular when viewed from below. This enables laterally pushing the centering aid onto the stirring unit's end. Even if the stirring unit's end has another than a round shape, an end section of the aforementioned type can be pushable onto said stirring unit's end.

According to one embodiment, the laterally open recess stretches up to the end of the hollow end region. The end section has then the same depth as the entire hollow end region.

According to another embodiment, the end section with the laterally open recess stretches not up to the end of the hollow end region, but at least as far as the length of the stirring unit's end (see definition above). This means that the stirring unit's end can completely be covered by the end section.

Particularly preferred, the distance between tip of the centering aid and underside of the work element, measured in working position of the removal aid along the rotation axis, corresponds approximately to the height of the stirring unit above the bottom, subtracted by the length of the stirring unit's end. This means that, when the removal aid is in working position, it rests with its tip just above the functional elements on the latter, and, at the same time, the underside of the work element rests on the bottom of the stirring bowl. In this way, two supports are provided which further stabilize the vertical position of the removal aid, and which, in addition, prevent any undesired tilting of the same.

It is also clear that the side of the work element which points towards the stirring unit's base is designed such that it does not collide therewith; elsewise, correct positioning of the removal aid would not be possible. Preferably, the outer contour of the base and the side of the work element pointing in this direction approximately correspond with each other in order to maximise the volume of the work element, and/or to provide an additional guidance along the outside of the base.

According to another embodiment, the removal aid comprises at least one catch for rotating movement of the at least one functional element. This means that during manual rotation of the removal aid, the rotatable parts of the stirring unit are automatically pushed along by the removal aid. However, in general, this is possible with any shape of the work edge of the work element, since the same always contacts at any time at some point of the rear side of the functional element; it is however preferred that a dedicated catch is provided which in particular ensures that neither the fragile working edge, nor a fragile portion of the functional element, are touched.

Preferably, the catch is designed to contact an edge of the functional element which is oriented contrary to the working direction, or to cooperate with the stirring unit's end. Said edge is normally not sharp and can therefore be touched safely. Said end can have a noncircular shape, which is adapted to the end region of the centering aid in such a way that a form-locking cooperation is enabled.

For a stirring bowl with a stirring unit having at least two functional elements, is is advantageous if a rear wall of the reception region which is positioned contrary to the working direction stretches up to the subsequent functional element. Thus, the space between two functional elements is optimally used, and the work element of the removal aid can hold the greatest possible amount of mix. When two functional elements are present, the work element has approximately the shape of a semicircle segment, when three functional elements are present, it has the shape of a third circle segment, and when four functional elements are present, it has the shape of a quarter circle segment.

Preferably, in a working position, the working edge deviates no more that 1 mm±2 mm from the contour of the stirring bowl. In other words, the working edge either adapts exactly to the contour of the stirring bowl, or a small gap is provided, or a slight abundance exists, resulting in deformation of the preferably elastically designed working edge, so that the same slides during operation with some friction along the inner side of the stirring bowl.

In the region of the base of the stirring unit, the distance can also be larger.

As already mentioned, at least the working edge is preferably made from an elastic material. Also, the entire work element can be made from such a material; the handle is preferably made from a rigid material.

The work element can be designed to be detachable from the handle, in order to be exchangeable with a work element of different shape. This can be advantageous in case of mix having different consistencies, or in case of exchange of the stirring bowl, e.g. with a mixing cup, or for cleaning, or for exchange due to wear or damage.

Henceforth, subsequently, the usage of the removal aid as defined above is described.

At first, introduction of the removal aid into the opening of the stirring bowl takes place, typically vertically from above, but also from a slightly lateral direction. This can be advantageous if the stirring unit is attached to a bridge which is arranged above the stirring bowl.

Then, positioning the removal aid in a way such that its work element is positioned between subsequent functional elements of the stirring unit takes place. This means that the work element is introduced in the interspace between the functional elements.

Then, centering aid of the removal aid is brought together with the stirring unit's end that points towards the opening, i.e. both parts are brought in close proximity to each other.

Now, the removal aid is aligned in a way such that rotation axis of the handle and rotation axis of the stirring unit coincide. This can be achieved by plugging from above as well as pushing from the side, depending on the design of the end region of the centering aid (see above). The removal aid is now in working position.

Eventually, rotation of the removal aid takes place by turning the handle around the rotation axis of the stirring unit, such that the working edge is guided along the bottom and/or the inner wall of the stirring bowl. Thus, mix is scraped off by means of the spatula-like working edge, and shoved into the convex reception region by subsequent mix. When the mix is completely removed, or when the working region is filled up, the removal aid is withdrawn from the stirring bowl in opposite order and emptied/cleaned, before it optionally is brought again in working position.

The described method of operation is simple and uncomplicated, and can be carried out by any user fast and secure, with a good working result, as well as without experience. Liquid as well as solid mix can be removed without having to tilt the stirring bowl. The risk of injure of a user as well as damage of the removal aid or the stirring unit is low. For the sake of conciseness, reference is made to the description regarding the removal aid.

Particularly preferable, by means of a catch according to the above definition, a continuous co-rotation of the rotatable components of the stirring unit occurs, while avoiding contact between working edge and preceding functional element. Thus, the stirring unit must not be touched manually, while in one workstep, the entire circumferential inside of the stirring bowl can be freed from mix. If necessary, several cycles are possible as well without manually touching the stirring unit.

According to a further embodiment, also, a rotation against the working direction takes place. This can serve for to accumulate the mix and for the subsequent removal upon rotation in the working direction. Rotation contrary to the working direction can also be helpful when the stirring bowl is tilted, since the working region can be used in order to support the emptying of the stirring bowl.

DESCRIPTION OF THE DRAWINGS

Subsequently, the invention is discussed exemplarily by aid of figures. Herein, it is shown by FIG. 1 depicting a preferred embodiment of a removal aid according to the invention in a front view;

FIG. 2 depicting the embodiment of FIG. 1 in a rear view;

FIGS. 5 and 6 depicting various situations when angularly withdrawing the removal aid;

FIGS. 7 to 9 depicting various situations when using the removal aid.

DETAILED DESCRIPTION OF PREFERRED EMBODIMENTS

Figure 3:
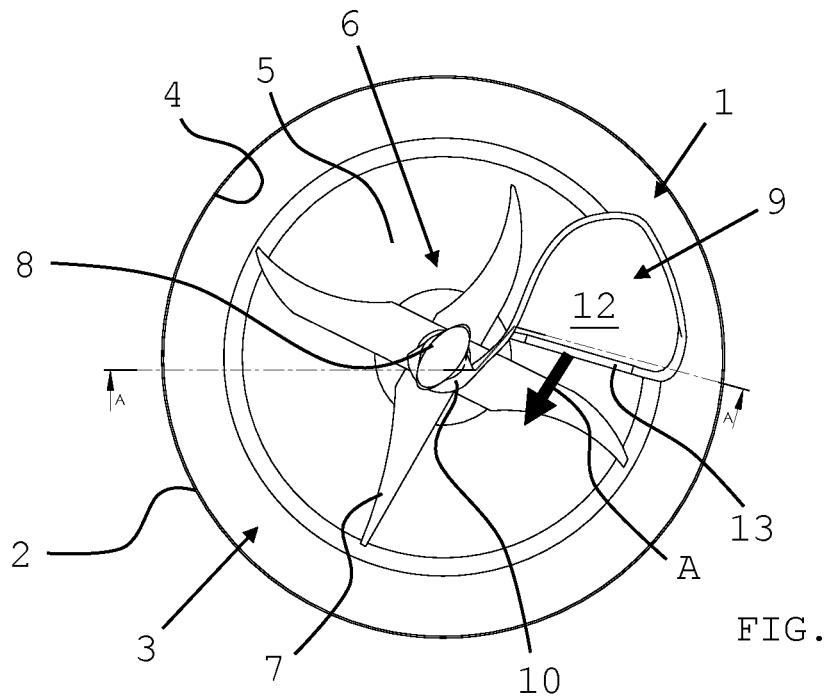
FIG. 3 depicting a top view onto a removal aid in working position which is positioned in a stirring bowl.

In FIG. 1, a preferred embodiment of a removal aid according to the invention in a front view is shown; FIG. 2 shows the embodiment of FIG. 1 in a rear view.

The removal aid 1 includes a handle 8 and a work element 9. Work element 9 includes a centering aid 10 which is designed to cooperate with a stirring unit's end 11 of stirring unit 6, the end pointing towards the opening 3 of a stirring bowl 2 (not shown, respectively). Work element 9 further has a convex reception region 12 with a spatula-like working edge 13 that points towards working direction A. Working edge 13 stretches along the front edge of the underside and along the outward oriented edge of the outside of work element 9.

Figure 4:
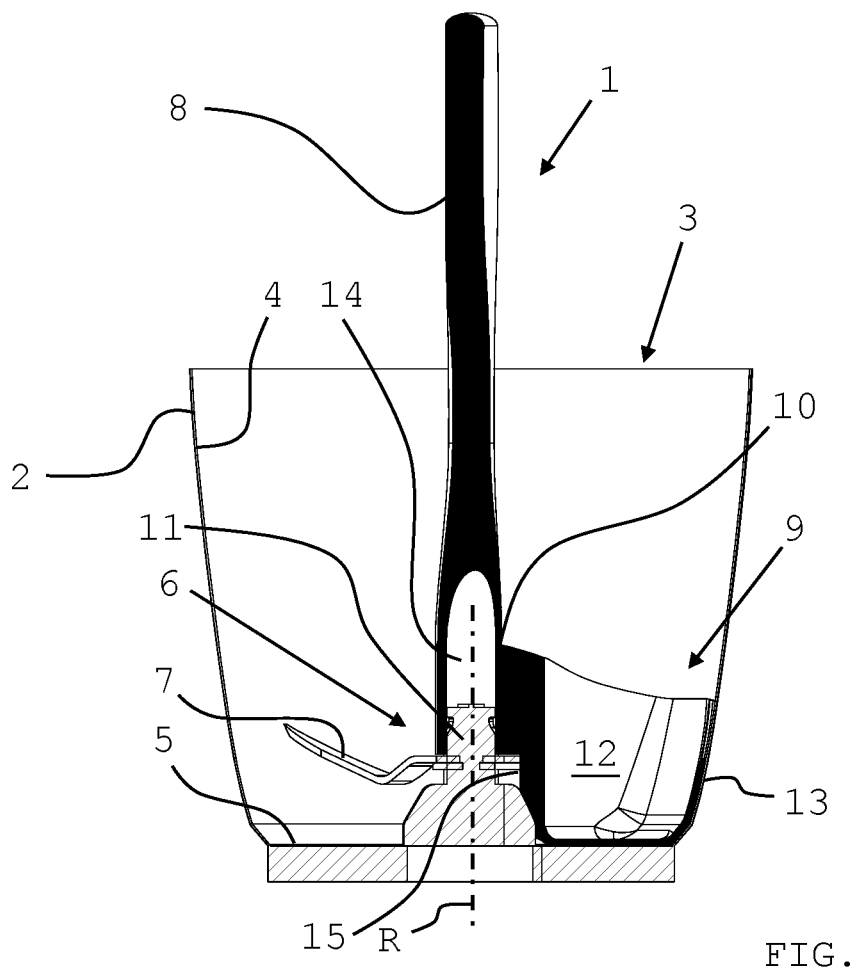
FIG. 4 depicting the situation of FIG. 3 in a cross sectional view.

In FIG. 3, a top view onto a removal aid in working position is shown which is positioned in a stirring bowl, and in FIG. 4, the situation from FIG. 3 is shown in a cross-sectional view.

Stirring bowl 2 comprises an opening 3, an inner wall 4, a bottom 5, as well as a rotatable stirring unit 6 which reaches into the interior through bottom 5 of stirring bowl 2, and which has four functional elements 7 (only one with reference numeral) for mixing and/or crushing of mix M (not shown).

It can be seen that centering aid 10 is designed to cooperate with a stirring unit's end 11 of stirring unit 6, the end pointing towards opening 3. Apparently, removal aid 1 can be centred onto said stirring unit's end 11, and it is rotatable inside stirring bowl 2 in (and contrary to) working direction A. It is further visible that working edge 13 has a shape that corresponds to contours of bottom 5 and inner wall 4, wherein naturally, this is true only for those sections of stirring bowl 2 in which the actual removal by means of the removal aid 1 shall take place. Since mix M (not shown) mostly accumulates particularly in the lower region of stirring bowl 2, and moreover, since this very region is poorly accessible due to the stirring unit 6 which is arranged there, it is reasonable to design the work element 9 as shown, such that it can remove mix M especially from this lower region.

It is further apparent that the reception region 12 also has in its section pointing towards bottom 5 and inner wall 4 a shape corresponding to the contour of bottom 5 and inner wall 4. Thus, the volume of the reception region 12 is maximized.

Centering aid 10 has a hollow end region 14 with an inner diameter which is adjusted to the outer diameter of the stirring unit's end 11. Thus, centering aid 10 can be plugged onto said stirring unit's end 11. Presently, end region 14 of centering aid 10 has a depth which exceeds the length of stirring unit's end 11. Therefore, stirring unit's end 11 can completely be covered by end region 14. Presently, hollow end region 14 has an end section with a laterally open cross section which is designed for pushing centering aid 10 onto stirring unit's end 11. In the depicted embodiment, the cross section is approximately semicircular. Thus, centering aid 10 can also be pushed laterally onto stirring unit's end 11, or it is tiltable, as depicted in FIGS. 5 and 6. This enables the removal aid 10 to be placed and removed obliquely from the stirring unit 6; rotation axis R of stirring unit 6 and rotation axis of the removal aid are at an angle to one another.

As can also be seen in FIG. 4, the distance between tip of centering aid 10 and underside of work element 9, measured along rotation axis R, just corresponds to the height of stirring unit 6 above bottom 5 of stirring bowl 2, subtracted by the length of stirring unit's end 11. Thus, in the depicted working position, removal aid 10 rests, with the centering aid's 10 tip which is pointing downwards in the picture, just above functional element 7. At the same time, the underside of work element 9 rests on bottom 5 of stirring bowl 2.

Removal aid 10 includes a catch 15 for rotating movement of functional element 7. Presently, catch 15 is provided by an edge of body which is provided at an appropriate location of work element 9. Thus, catch 15 is designed to contact an edge of functional element 7 which is oriented contrary to working direction A.

In FIG. 3, it is also visible that the rear wall of the reception region 12 which is positioned contrary to working direction A stretches up to the subsequent functional element 7. Thus, the space between two functional elements 7 is optimally used.

In FIGS. 7 to 9, various situations when using the removal aid are shown. For the sake of clarity, the reference numerals are widely omitted.

In FIG. 7, mix M is located between two functional elements 7 on bottom 5 of stirring bowl 2. By manual rotation of removal aid 1 in direction of the arrow (working direction A), the reception region 12 moves towards mix M. At the same time, catch 15 drags along rotatable parts of stirring unit 6. In FIG. 8, working edge 13 is already pushed under mix M, thus conveying the same into reception region 12. By further rotation, mix M eventually arrives completely within reception region 12 (FIG. 9). Now, removal aid 1 can, as shown e.g. in FIGS. 5 and 6, be withdrawn from stirring bowl 2, and mix M can be removed from reception region 12.

LIST OF REFERENCES 1 removal aid
2 stirring bowl
3 opening
4 inner wall
5 bottom
6 stirring unit
7 functional element
8 handle
9 work element
10 centering aid
11 stirring unit's end
12 reception region
13 working edge
14 end region
15 catch
M mix
R rotation axis
A working direction

What is claimed is:

1. A removal aid for removal of liquid and solid mix from a stirring bowl for a food processor, the stirring bowl comprising an opening, an inner wall, a bottom, as well as a rotatable stirring unit which reaches into the interior of the stirring bowl through the bottom and which has at least one functional element for mixing and/or crushing the mix, wherein the removal aid comprises a handle and a working element and is intended for rotation in a working direction, further wherein the working element comprises:
   a centering aid which is designed to cooperate with the stirring unit for rotation and centering of the removal aid, and
   a convex reception region that bulges contrary to the working direction to form a scoop with a spatula-like working edge pointing in the working direction so that as the removal aid rotates around the bowl in the working direction, liquid and solid mix can be collected in the reception region for removal.

2. The removal aid according to claim 1, wherein the working edge has a shape corresponding to the contour of the bottom and/or the inner wall.

3. The removal aid according to claim 1, wherein the reception region has, in its section pointing towards the bottom and/or the inner wall, a shape corresponding to the contour of the bottom and/or the inner wall.

4. The removal aid according to claim 1, wherein the centering aid has a hollow end region with an inner diameter which is adjusted to the outer diameter of the stirring unit's end.

5. The removal aid according to claim 4, wherein the end region of the centering aid has a depth which exceeds the length of the stirring unit's end.

6. The removal aid according to claim 1, wherein the centering aid has a hollow end region which provides at least at an end section a laterally open cross section which is designed for pushing the centering aid onto the stirring unit's end.

7. The removal aid according to claim 1, wherein the distance between the tip of the centering aid and the underside of the work element, measured along the rotation axis, corresponds to the height of the stirring unit above the bottom, subtracted by the length of the stirring unit's end.

8. The removal aid according to claim 1, further comprising at least one catch for rotating movement of the at least one functional element, and wherein the catch is designed to contact an edge of the functional element which is oriented against the working direction, or to cooperate with the stirring unit's end.

9. The removal aid according to claim 1 for a stirring bowl with a stirring unit having at least two functional elements, wherein a rear wall of the reception region which is positioned contrary to the working direction stretches up to the subsequent functional element.

10. The removal aid according to claim 1, wherein in a working position, the working edge deviates no more than 1 mm±2 mm from the contour of the stirring bowl.

11. The removal aid according to claim 1, wherein at least the working edge is made from an elastic material.

12. A method of using the removal aid according to claim 1, the method comprising the following steps:
   introducing the removal aid into the opening of the stirring bowl;
   positioning the removal aid in a way such that its working element is positioned between subsequent functional elements of the stirring unit;
   bringing together the centering aid of the removal aid with the stirring unit's end that points towards the opening;
   aligning the removal aid in a way such that a rotation axis of the handle and rotation axis of the stirring unit coincide; and
   rotating the removal aid by turning the handle around the rotation axis of the stirring unit, such that the working edge is guided along the bottom and/or the inner wall of the stirring bowl, so that mix is scraped off by means of the spatula-like working edge, and shoved into the convex reception region by subsequent mix.

13. The method according to claim 12, wherein by means of a catch, a continuous co-rotating of the rotatable components of the stirring unit occurs, while avoiding contact between the working edge and preceding functional element.

14. The removal aid according to claim 1, wherein the centering aid is at an end of the handle.

15. The removal aid according to claim 1, wherein the working edge is a blade configured to scrape a surface of the stirring bowl.

16. The removal aid according to claim 15, wherein the blade is an elastic blade.

17. The removal aid according to claim 1, wherein the working direction is a rotational direction.

* * * * *